United States Patent Office 3,455,642
Patented July 15, 1969

3,455,642
POLYMER EMULSION COMPOSITIONS FOR TREATING TEXTILES
Gerald Louie Solomon, Langley, S.C., assignor to United Merchants and Manufacturers, Inc., New York, N.Y., a corporation of Delaware
No Drawing. Filed Nov. 5, 1965, Ser. No. 506,601
Int. Cl. D06m *13/00, 11/00*
U.S. Cl. 8—115.6                                          7 Claims

ABSTRACT OF THE DISCLOSURE

An aqueous textile-treating emulsion composition comprising an amino resin, a thermoplastic resin mixture comprising polyethylene and polypropylene, an inorganic salt activator and an emulsifier, which composition imparts permanent crease effects, stabilization, improved crease angles without deterioration in tensile, tear and abrasion resistance.

---

This invention is concerned with the treatment of textile materials for improvement in physical properties and in particular provides a novel polymer emulsion composition for use in such treatment.

Cellulosic fabrics and fabrics comprising blends of natural cellulosic fibers and synthetic fibers are often treated for the achievement of permanent crease effects, stabilization, improved smoothness after multiple washings and improved crease angles. Such treatments usually involve the application to the fabric of amino-containing materials. These amino materials are resin components and may be provided as already fully polymerized resins, partially polymerized materials, or monomers which react with components of the fabric to form resin-like structures. Even polymerized amino materials sometimes deploymerize to form new amino resin-like structures with the fabric. Many amino-component formulations are known to the art and are described by J. F. Blais in "Amino Resins," New York, Reinhold, 1959, on pages 143–170. Melamine and urea formaldehyde precondensates and modifications of these resins, including dimethyl-diethylene ureas, dimethyloldihydroxy ethylene ureas, and the like, often are used to provide the desired effects and the formulations for cotton treating also usually include a minor amount of a thermoplastic resin. Polyethylene is often chosen and is used in amounts varying up to about 35 or 40% of the total resin in the treating mixture.

A universal problem encountered when amino resinous or pre-resinous materials are used is in deterioration of certain other fabric properties. Specifically, these adverse effects include degradation of tensile, tear and abrasion resistance. In this invention, fabrics may be treated to impart permanent crease effects, smoothness, etc., without undue deterioration in tensile, tear and abrasion properties. In this invention, fabrics, usually containing at least some cellulosic fibers, e.g., cotton, are treated with an emulsion containing a mixture of polyethylene and polypropylene as the thermoplastic resin ingredient. Advantageously, the emulsion also contains an activating composition comprising both zinc nitrate and magnesium chloride, rather than merely a single inorganic salt.

The mixture of polyethylene and polypropylene in the emulsion often will comprise an equal amount of each; however, the proportions may vary from about 10–90% of one to about 10–90% of the other. The type of resin employed is ordinarily not critical, although they are used in molecular weights sufficient to provide solids at ordinary temperatures. The molecular weight of each resin may be from about 1400 to 12,000. Polypropylene ordinarily is obtained in the crystalline isotactic or syndiotactic form and may be used as such in this invention. Ordinary "high pressure" amorphous polyethylene is used satisfactorily in this invention, but crystalline forms also may be used when desired.

In this invention, the aqueous treating emulsion may vary in solids content depending upon the amount of resinous ingredients desired to be left in combination with the cloth. As mentioned, the thermoplastic resin component may comprise about 1–40% of the total resin (including pre-resin) solids. Preferably, 5–20 or 30% thermoplastic resin mixture is used by weight of the amino resin component. The emulsion contains a surfactant, preferably of the non-ionic type, in an amount sufficient to disperse the non-water soluble-ingredients.

As mentioned, an inorganic metal salt often is used as the catalyst or activator in textile treating with emulsions of the type disclosed herein. The amount of catalyst on a dry basis generally will be about 1 to 10% by weight of the amino resin or pre-resin component. Advantageously, about 2–5% catalyst is employed. As mentioned, it is preferable in this invention to use a mixture of zinc nitrate and magnesium chloride. Generally, each of these salts will comprise about 5–95% of the activator mixture, that is, the activator salt will contain at least about 5% of another activator salt. The activators may be any of those known to the art and generally will comprise inorganic salts of Group II metals which are at least water-soluble enough to provide the desired amount of activator in solution. An activator mixture comprising about seven parts by weight of zinc nitrate hexahydrate to one part of magnesium chloride hexahydrate is preferred.

The novel textile-treating emulsions of this invention are easily made by mixing the ingredients of the desired mixture with water. It may sometimes be necessary to form the polyethylene-polypropylene into a preliminary emulsion concentrate. This may be done by milling the dry resins in a small amount of water containing the surfactant or by heating or dispersion of the solid resins in water containing the surfactant at the melting point of the resins while agitating the mixture.

The textile materials may be impregnated with the emulsion using conventional techniques and, after impregnating, the water is generally evaporated in a drying step. After drying, the cloth will usually be cured by exposure to heat. Adequate curing can take place at temperatures of about 250 to 450° F., but not so high as to destroy the fabric. Times of about 0.1 to 30 minutes may be employed, generally longer time periods being required at the lower temperatures. The tensile, tear and abrasion properties are especially improved by high temperature, short-time curing, advantageously at about 400° F. for less than one minute.

Examples

The following fabrics were treated according to this invention and tested. Fabric A was a grey, 100% cotton twill having 1.39 yards per pound; fabric B was a blue, 100% cotton twill having 1.09 yards per pound; fabric C was a beige 85% cotton-15% nylon fabric having 1.13 yards per pound. These fabrics were in a bleached and dyed, but otherwise unfinished, state.

Four treating emulsion baths were made up as follows, the ingredients being given in grams. Enough water was used in each emulsion to give 500 milliliters.

| Emulsion | F | G | H | J |
|---|---|---|---|---|
| Dihydroxy dimethylolurea | 75 | 75 | 93.5 | 93.5 |
| Non-ionic nonyl phenoxy poly (ethyleneoxy) ethanol surfactant | 0.5 | 0.5 | 0.5 | 0.5 |
| Polyethylene (2,500 M.W.) | 3.5 | 1.75 | 3.5 | 1.75 |
| Polypropylene (3,800 M.W.) | | 1.75 | | 1.75 |
| Activator: | | | | |
| Zinc nitrate hexahydrate | 2.36 | 2.06 | 2.84 | 2.48 |
| Magnesium chloride hexahydrate | | 0.30 | | 0.36 |

The fabric samples were laboratory-impregnated with two dips and two nips on a Butterworth laboratory padder. The samples were then dried on a steam-heated cylinder to 8-10% residual moisture, pressed for 12 seconds on a platen press with a surface temperature of about 320° F. and where then cured for about 15 minutes at about 325° F. Following this, all samples were laboratory-conditioned for 24 hours under a standard environment of 65° F. (±2½° F.) and 70% (±3%) relative humidity. Table I, below, shows the results obtained from the treatment.

TABLE I

| | Example | | | | | |
|---|---|---|---|---|---|---|
| | I | II | III | IV | V | VI |
| | Fabric | | | | | |
| | A | A | B | B | C | C |
| | Emulsion | | | | | |
| | F | G | F | G | H | J |
| Crease recovery angle: | | | | | | |
| Warp | 167 | 153.3 | 152.0 | 146.3 | 154.0 | 141.3 |
| Fill | 135.3 | 133.7 | 156.7 | 155.3 | 156.7 | 152.3 |
| Total | 302.3 | 287.0 | 308.7 | 301.6 | 310.7 | 293.6 |
| Tensile: | | | | | | |
| Warp | 84.4 | 129.8 | 110.8 | 137.8 | 107.6 | 120.4 |
| Fill | 44.2 | 65.4 | 51.2 | 65.6 | 68.0 | 78.4 |
| Percent improvement: | | | | | | |
| Warp | | 53.8 | | 24.4 | | 11.9 |
| Fill | | 48.0 | | 28.1 | | 15.3 |
| Tear (grams): | | | | | | |
| Warp | 1,568 | 1,782 | 1,536 | 1,728 | 1,078 | 1,174 |
| Fill | 1,098 | 1,280 | 1,142 | 1,344 | 1,216 | 1,078 |
| Percent Improvement: | | | | | | |
| Warp | | 13.6 | | 12.5 | | 8.9 |
| Fill | | 16.6 | | 17.7 | | 12.8 |
| Stoll flex abrasion: | | | | | | |
| Warp | 56.4 | 275.4 | 48.0 | 100.4 | (1) | (2) |
| Fill | 187.8 | 474.0 | 84.4 | 187.8 | 716.6 | 824.8 |
| Percent improvement: | | | | | | |
| Warp | | 388 | | 109 | | 0 |
| Fill | | 152 | | 123 | | 15.1 |

[2] 500 cyc. not serviceable.
[1] 500 cyc. serviceable.

To evaluate the effects of variable curing conditions, additional samples of fabric A were impregnated with additional amounts of emulsions F and G. Following the identical squeezing and drying conditions reported above, the fabric from each impregnation was divided into four parts and cured under the following conditions:

K.—20 minutes at 300° F.
L.—10 minutes at 250° F.
M.—5 minutes at 375° F.
N.—0.5 minute at 400° F.

The results of the impregnation and curing are given in Table II attached.

TABLE II

| Example | VII | VIII | IX | X | XI | XII | XIII | XIV |
|---|---|---|---|---|---|---|---|---|
| Emulsion | F | G | F | G | F | G | F | G |
| Cure | K | K | L | L | M | M | N | N |
| Crease recovery angle: | | | | | | | | |
| Warp | 164.3 | 151.3 | 167 | 160 | 166.3 | 156 | 163.7 | 142.7 |
| Fill | 143.3 | 135.0 | 143 | 140.3 | 147 | 137.7 | 140.3 | 128.7 |
| Total | 307.6 | 286.3 | 310 | 300.3 | 313.3 | 293.7 | 304.0 | 271.4 |
| Tensile: | | | | | | | | |
| Warp | 95.4 | 129.4 | 93.8 | 118.8 | 85.8 | 107.6 | 118.0 | 140.2 |
| Fill | 44.6 | 61.8 | 43.0 | 58.4 | 41.0 | 59.8 | 54.4 | 70.8 |
| Tear (grams): | | | | | | | | |
| Warp | 1,664 | 1,760 | 1,504 | 1,642 | 1,450 | 1,642 | 1,824 | 2,038 |
| Fill | 1,184 | 1,430 | 1,066 | 1,376 | 1,120 | 1,302 | 1,536 | 1,674 |
| Stoll flex abrasion: | | | | | | | | |
| Warp | 62.0 | 260.7 | 35.2 | 219.4 | 57.6 | 253.2 | 245.4 | 819.4 |
| Fill | 172.0 | 556.4 | 160.6 | 405.8 | 194.8 | 448.2 | 512.2 | 875.2 |

It is readily seen from these data that the textile-treating emulsion of this invention provides fabrics with improved strength, tear and abrasion resistance, especially when cured at high temperatures.

What is claimed is:

1. A textile-treating composition in emulsion form consisting essentially of a thermosetting amino resin component, about 1-40% by weight of the amino resin component of a thermoplastic resin mixture consisting essentially of about 10-90% polyethylene having a molecular weight of about 1400 to 12,000, and about 90-10% polypropylene having a molecular weight of about 1400 to 12,000, an emulsifier, an inorganic Group II metal salt activator and water.

2. The composition of claim 1 in which the thermoplastic resin mixture consists essentially of about equal weights of polyethylene and polypropylene.

3. The composition of claim 1 wherein the metal salt activator is present in an amount of about 1 to 10% by weight on a dry basis of the amino resin component.

4. The composition of claim 1 in which the thermoplastic resin mixture is present in the amount of about 5-30% by weight of the amino resin component.

5. The composition of claim 4 wherein the metal salt activator is a mixture of about seven parts zinc nitrate hexahydrate and one part magnesium chloride hexahydrate.

6. A method for treating cellulosic fabrics and fabrics comprising blends of cellulosic and synthetic fabrics which comprises impregnating the fabric with the emulsion of claim 1, drying the fabric and curing the same.

7. A method according to claim 6 wherein curing takes place at a temperature of about 400° F.

References Cited

UNITED STATES PATENTS

| | | | |
|---|---|---|---|
| 2,299,807 | 10/1942 | Dunbar | 260—854 X |
| 2,558,053 | 6/1951 | Lee | 260—29.4 X |
| 2,917,412 | 12/1959 | Reinhardt et al. | 260—854 X |
| 3,283,036 | 11/1966 | Larson | 260—854 X |
| 3,285,690 | 11/1966 | Cooper et al. | 8—115.6 X |

HERBERT B. GUYNN, Primary Examiner

U.S. Cl. X.R.

8—115.7, 116.3; 117—139.5; 260—29.4, 854, 897